United States Patent
Roelleke

(10) Patent No.: US 6,597,974 B2
(45) Date of Patent: Jul. 22, 2003

(54) METHOD OF DETERMINING THE SEVERITY OF A FRONTAL IMPACT

(75) Inventor: Michael Roelleke, Leonberg-Hoefingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/070,456

(22) PCT Filed: Jul. 12, 2001

(86) PCT No.: PCT/DE01/02536

§ 371 (c)(1),
(2), (4) Date: Jul. 2, 2002

(87) PCT Pub. No.: WO02/04258

PCT Pub. Date: Jan. 17, 2002

(65) Prior Publication Data

US 2002/0173886 A1 Nov. 21, 2002

(30) Foreign Application Priority Data

Jul. 12, 2000 (DE) .......................................... 100 33 907

(51) Int. Cl.$^7$ ................................................. G06F 7/00
(52) U.S. Cl. ..................... 701/45; 280/728.1; 340/438; 180/282
(58) Field of Search .............................. 701/45, 46, 47; 280/728.1, 734, 735; 340/438; 180/170, 271, 282

(56) References Cited

U.S. PATENT DOCUMENTS 5,229,943 A * 7/1993 Eigler et al. .................. 701/46
5,411,289 A * 5/1995 Smith et al. ................. 280/735

FOREIGN PATENT DOCUMENTS

| DE | 21 23 359 | 1/1972 |
| DE | 39 24 507 | 8/1990 |
| DE | 198 16 989 | 11/1999 |
| DE | 199 55 559 | 6/2000 |
| GB | 2 293 681 | 4/1996 |

* cited by examiner

Primary Examiner—Yonel Beaulieu
(74) Attorney, Agent, or Firm—Kenyon & Kenyon

(57) ABSTRACT

A simple method of differentiating among several different impact severties is described.

To do so, the deceleration measured by a front sensor situated in the front area of the vehicle or the velocity (v) derived from it by integration is compared with a basic threshold (GS) which has a characteristic which is not exceeded by a measured deceleration/velocity (v) at which the restraint devices in the vehicle are not yet to be deployed. At least one additional threshold (S1, S2) having a slope greater than that of the basic threshold (GS) is provided, and this additional threshold (S1, S2) branches off from the basic threshold (GS) at the point where the basic threshold (GS) is exceeded by the measured deceleration/velocity (v). The slope of the at least one additional threshold (S1, S2) is selected so that it is exceeded by the measured deceleration/velocity (v) only at a certain impact severity.

4 Claims, 2 Drawing Sheets

METHOD OF DETERMINING THE SEVERITY OF A FRONTAL IMPACT

BACKGROUND INFORMATION

The present invention relates to a method of determining the severity of a front impact of a motor vehicle, at least one front sensor being installed in the front area of the vehicle to measure a deceleration which is caused by an impact and is used to derive information regarding the severity of the impact.

It is known from British Patent Application 2 293 681 A that one or more front sensors may also be provided in addition to an acceleration sensor situated centrally in the vehicle, their acceleration signals measured in the crash zone in the front area of the vehicle being taken into account in a restraint device (e.g., airbags, seat-belt tightening systems, etc.) deployment decision. With the help of the acceleration measured on impact in the front area of the vehicle, it is possible to obtain information regarding the impact severity. With such information regarding the impact severity, which cannot be obtained with a central acceleration sensor system alone, it is possible to eliminate most cases of faulty deployment and to achieve a very good adaptation of restraint system deployment properties to impact severity. According to the publication cited above, British Patent Application 2 293 681 A, the acceleration measured by the front sensor is integrated, and the integral value is compared with a fixed threshold. If the integral value exceeds this fixed threshold, this means that an impact of a certain severity has occurred. This publication does not indicate how it is possible to differentiate between several different impact severities which differ only slightly.

Therefore, the object of the present invention is to provide a method of the type defined in the preamble with which it is possible to differentiate easily between several different impact severities.

ADVANTAGES OF THE INVENTION

This object is achieved with the features of claim 1 by comparing the deceleration measured by at least one front sensor or the velocity derived from it by integration with a basic threshold which has a characteristic such that it is not exceeded by a measured deceleration/velocity, which is measured in an impact of a severity which does not yet require deployment of restraint devices in the vehicle. At least one additional threshold having a greater slope than that of the basic threshold is formed, this additional threshold having the greater slope branching off from the basic threshold at the point where the basic threshold is exceeded by the measured deceleration/velocity. The slope of the at least one additional threshold is selected so that it is exceeded by the measured deceleration/velocity only at a certain impact severity.

Due to the fact that the deceleration/velocity measured by the front sensor is compared according to the present invention with several thresholds having different slopes, it is possible to differentiate very precisely between various impact severities. Accordingly, the deployment of restraint devices in the vehicle can be adapted to the given impact severity. This adaptation may involve, for example, the rate or degree of inflation of airbags or the choice of airbag inflation levels. A more precise differentiation among various impact severities is also possible since the thresholds are not simply constant values over time but instead have different slopes as a function of time.

Advantageous refinements of the present invention are derived from the subclaims.

It is expedient to provide as many thresholds having different slopes as there are different impact severities to be differentiated.

A very simple means of implementing the thresholds is obtained because of the fact that the basic threshold and each additional threshold begin their chronological course at the beginning of an impact with the same constant minimum value and develop into an individual maximum value having an individual slope after a time lag which is predetermined by the impact severity to be determined.

To allow the use of the least possible computer power in making the threshold value decisions, it is expedient that the individual thresholds develop from a minimum value to their maximum value in a stepped slope characteristic.

DRAWING

The present invention is illustrated in the drawing and explained in greater detail in the following description on the basis of one embodiment.

DESCRIPTION OF A EXEMPLARY EMBODIMENT

Figure 1:
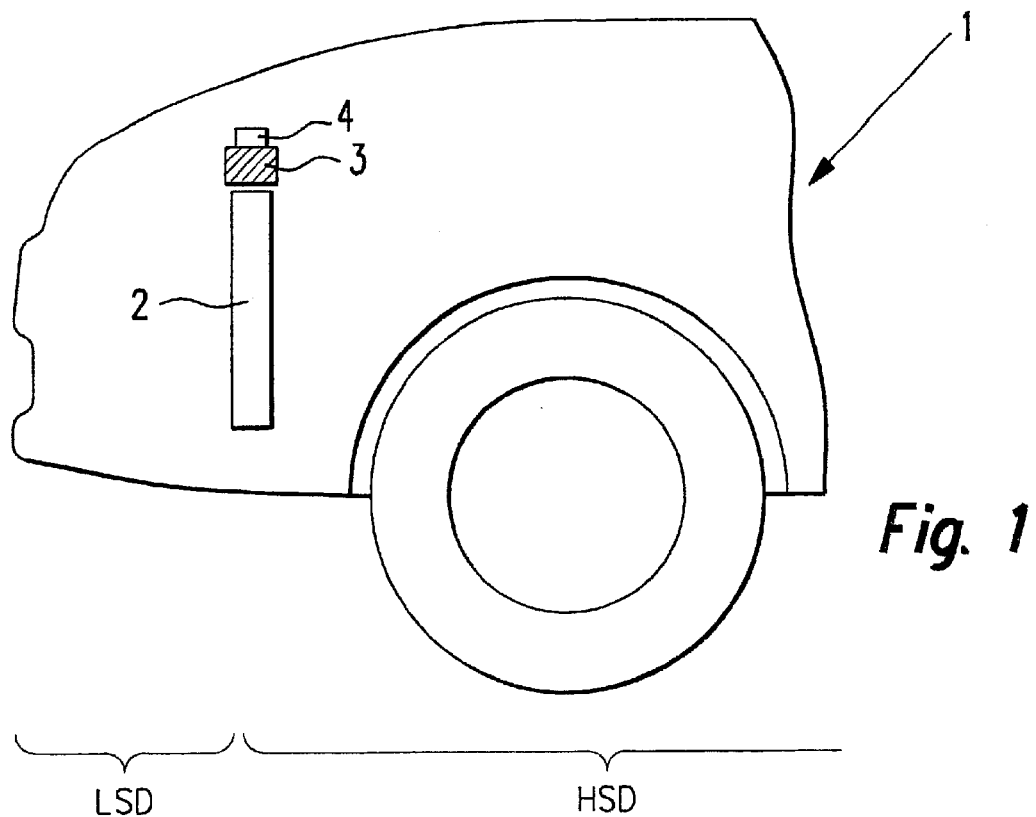
FIG. 1 shows the front area of a vehicle having a front sensor situated in it.

FIG. 1 shows a schematic block diagram of front area 1 of a vehicle in a side view, indicating engine radiator 2 and a transverse beam 3 above it functioning as the radiator bridge. The area in front of radiator 2 and radiator bridge 3 of the vehicle, labeled as LSD in the drawing, is deformed even at a relatively low impact velocity. At this impact velocity, seat-belt tightening devices should be deployed, but airbags should not yet be deployed. The HSD area behind radiator 2 has a more stable structure and is deformed only in an impact at a higher velocity (e.g., above approx. 25 km/h). At the end of the front LSD zone, which is deformed even at a low impact velocity, there is a front sensor 4 which is preferably installed on transverse beam 3 above radiator 2. This front sensor 4 therefore senses a mentionable deceleration only when the impact severity is so great that the impact energy is no longer absorbed by the front "soft" LSD zone. Only at a greater impact severity, which has effects on the second "harder" HSD zone, does front sensor 4 react with an increase in the deceleration signal measured by it. The signal rise occurs due to the direct contact of the sensor with the barrier penetrating into the vehicle or with the fixed structure compressed by the barrier.

Instead of just one front sensor, multiple front sensors may also be used if more detailed information regarding an impact is to be obtained. For the sake of simplicity, however, the following discussion is always based on only one front sensor 4.

Figure 2:
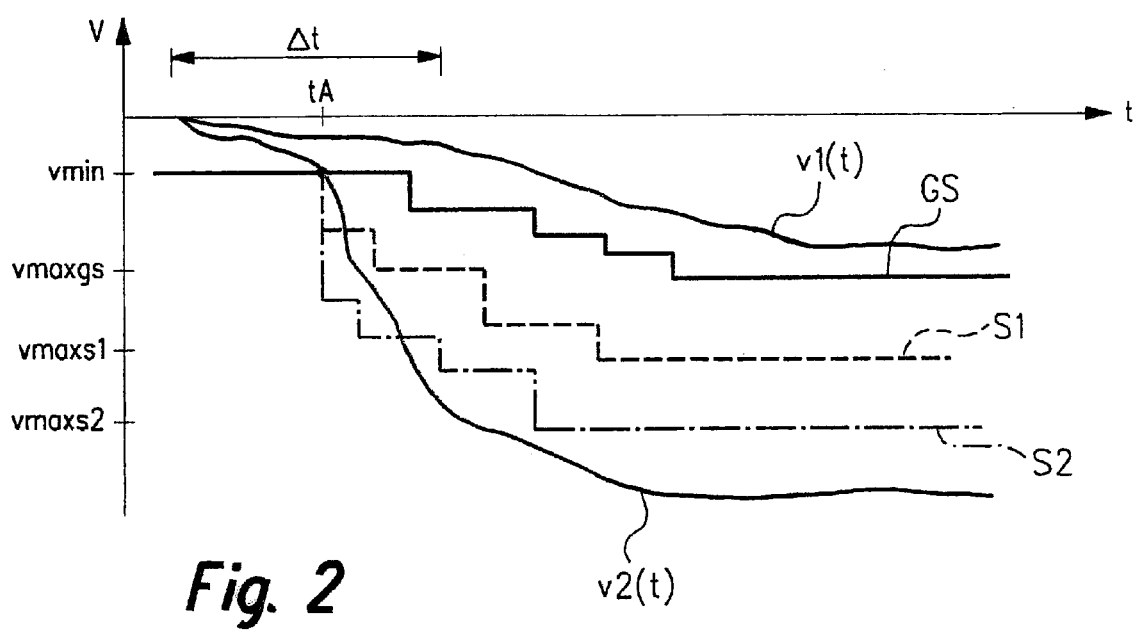
FIG. 2 shows several curves of measured decelerations or velocities and threshold value curves.

FIG. 2 shows as an example two time curves of velocity signals v1(t) and v2(t) which are obtained by integration of the accelerations or decelerations measured by front sensor 4 in impacts of varying severity. Velocity signal v1(t) results from a low-severity impact (lower impact velocity) and indicates that a lag time Δt elapses from the beginning of the impact until velocity signal v1(t) experiences a significant change in slope. Lag time Δt is thus explained by the fact that the deformation of the front soft LSD zone takes place in this period of time and only then does front sensor 4 detect a deceleration or a change in velocity with an effect on the following harder HSD zone. At a greater impact severity, velocity signal v2(t) is obtained. In this case the lag time during which front sensor 4 shows hardly any response is much shorter, and the subsequent slope of signal v2(t) is much greater than it is with signal v1(t) at a lower impact severity. It can thus be concluded that the greater the impact severity, the smaller is the initial lag time Δt and the greater is the subsequent slope of the velocity signal. It is also true that initial lag time Δt is lower and the subsequent slope of the velocity curve is greater, the harder the barrier in the case of a fixed impact velocity or the greater the impact velocity with a fixed barrier.

Now the severity of an impact is to be derived from the output signal of front sensor 4, so that this information may be used in a central control unit to optimize the deployment properties of restraint devices in the vehicle to the prevailing impact severity. To classify the deceleration measured by front sensor 4 or the velocity v derived from it by integration in various impact severities, threshold value decisions are carried out. To this end, as illustrated in FIG. 2, multiple thresholds GS, S1 and S2 are provided. These thresholds GS, S1, S2 are based on velocity v derived by integration of the deceleration measured by front sensor 4. However, the threshold value decision could also be made with the deceleration measured by the front sensor.

All thresholds GS, S1 and S2 begin with the same common minimum velocity vmin, then developing into maximum values vmaxgs, vmaxs1, vmaxs2 of the velocity with different slopes. There is a basic threshold GS whose maximum value is vmaxgs. This basic threshold GS has the lowest slope between minimum velocity vmin and maximum velocity vmaxgs. The course of the basic threshold is selected so that it is not exceeded by a velocity measured in an impact of a severity such that the restraint devices in the vehicle are not yet to be deployed. Two other thresholds S1 and S2 develop into maximum values vmaxs1 and vmaxs2 having different slopes. The slopes and maximum values vmaxs1 and vmaxs2 of two thresholds S1 and S2 are selected so that if threshold S1 is exceeded by velocity curve v(t), a moderate impact severity is detectable, and if threshold S2 is exceeded by velocity curve v(t), a high impact severity is detectable.

As indicated in FIG. 2, the transitions of thresholds GS, S1 and S2 from minimum velocity vmin to the respective maximum values vmaxgs, vmaxs1, vmaxs2 take place in steps. Stepped curve characteristics are selected because a lower computer power is necessary for the threshold value decisions in this way. However, the curve characteristics may also be continuous or may involve a much larger number of steps than those illustrated in FIG. 2.

Figure 3:
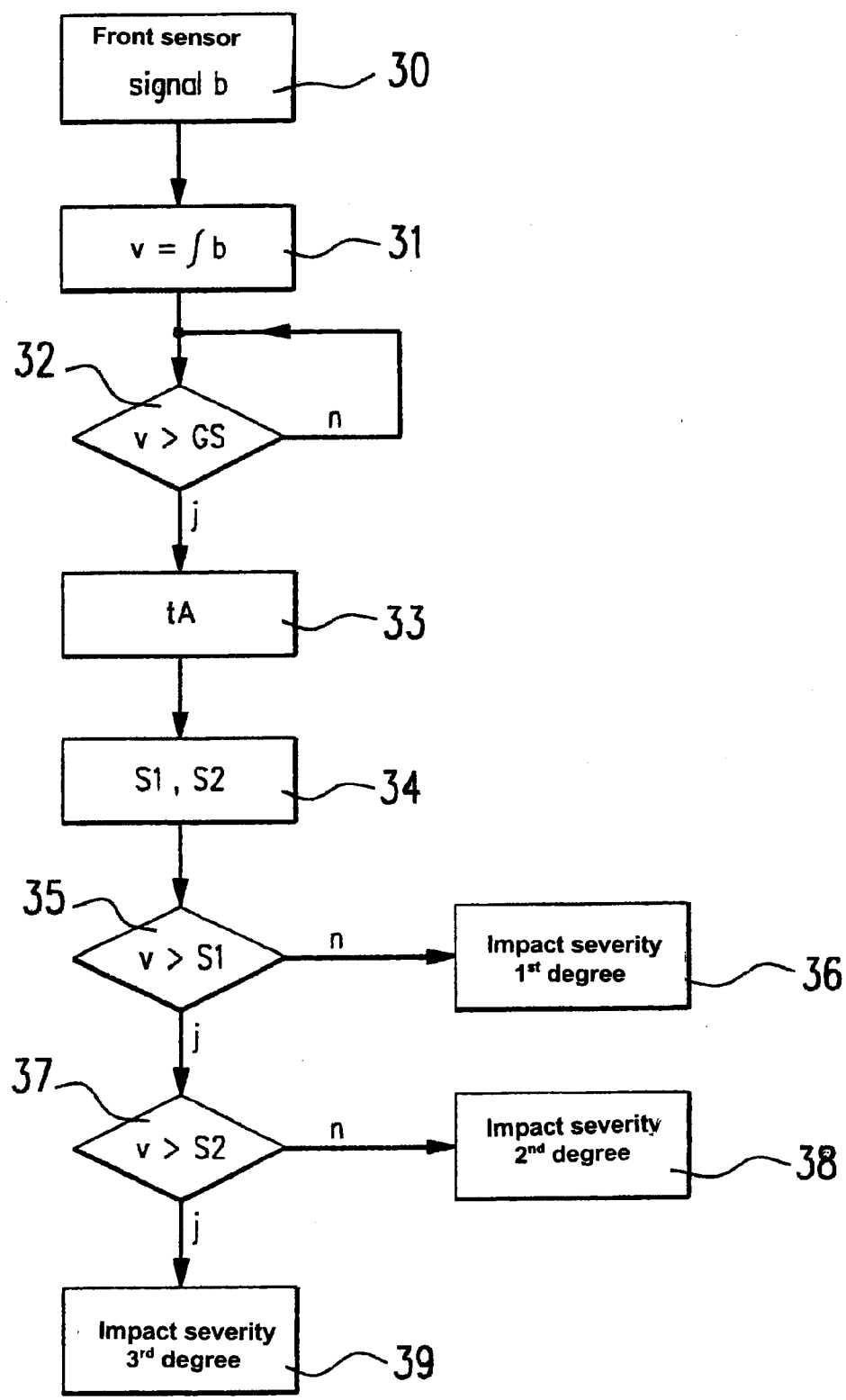
FIG. 3 shows a flow chart for determining the impact severity.

The derivation of the various impact severities from the measurement signal supplied by front sensor 4 will now be described on the basis of the flow chart in FIG. 3. In a first step 30, the measurement signal of front sensor 4, indicating deceleration b of the vehicle in a front impact, is picked up. In a next process step 31, the integral of measured deceleration b is formed. The integral of acceleration b is velocity v. In FIG. 2, two time-dependent velocity curves v1(t) and v2(t) at which impacts of different severity have been measured are plotted as an example. In third step 32, measured velocity v is first compared with basic threshold GS. If this basic threshold GS is not exceeded by measured velocity v, there should not be any deployment of restraint devices.

However, if basic threshold GS is exceeded by measured velocity v, as occurs in the example illustrated in FIG. 2 due to velocity curve v2(t), then time tA of exceeding basic threshold GS is determined in step 33. At this time tA, other thresholds S1 and S2 having different slopes branch off in step 34. In next step 35, measured velocity v is first compared with middle threshold S1. If velocity v does not exceed this threshold S1, then in step 36 it is decided that this is an impact severity of degree 1. This impact severity degree 1 indicates an impact in which the seat-belt tightening devices, for example, are activated but the airbags should not yet be deployed.

However, if threshold S1 is exceeded by measured velocity v, then in next step 37 a query is made as to whether this velocity v also exceeds threshold S2. If the latter is not the case, then in step 38 an impact severity of degree 2 is decided. In addition to seat-belt tightening systems, airbags are also activated in an impact severity of degree 2. However, in this case the airbags are inflated with a lower intensity.

If it is found that measured velocity v having the greatest slope also exceeds threshold S2, then in step 39 an impact severity of degree 3 is decided. This is an impact severity degree which requires the available airbags to be inflated with the greatest intensity available.

If it is necessary to differentiate among more than just three degrees of impact severity, then measured velocity v may also be subjected to more than just three threshold value decisions.

What is claimed is:

1. A method of determining a severity of a front impact of a motor vehicle through at least one front sensor that is installed in a front area of the motor vehicle, the method comprising:

measuring a deceleration caused by the front impact;

performing an integration on the measured deceleration to derive a velocity;

deriving from the measured deceleration information regarding the severity of the front impact;

comparing one of the measured deceleration and the derived velocity with a basic threshold having a characteristic such that the threshold is not exceeded by the one of the measured deceleration and the derived velocity at which a restraint device in the motor vehicle is not yet to be deployed;

forming at least one additional threshold having a slope greater than that of the basic threshold, the at least one additional threshold branching off from the basic threshold at a point where the basic threshold is exceeded by the one of the measured deceleration and the derived velocity; and selecting a slope of the at least one additional threshold so that the at least one additional threshold is exceeded by the one of the measured deceleration and the derived velocity only at a certain impact severity.

2. The method according to claim 1, wherein:

a number of thresholds of different slopes made available corresponds to a number of different impact severities to be differentiated.

3. The method according to claim 1, wherein:

at a start of the front impact, the basic threshold and each additional threshold begin at the same constant minimum value, and after a time lag that is predefined by the severity of the front impact, the basic threshold and each additional threshold transition into respective, individual maximum values corresponding to individual slopes.

4. The method according to claim 3, wherein:

each one of the basic threshold and each additional threshold transitions from the same constant minimum value to the respective maximum values in a stepped curve.

* * * * *

UNITED STATES PATENT AND TRADEMARK OFFICE
CERTIFICATE OF CORRECTION

PATENT NO. : 6,597,974 B2
DATED : July 22, 2003
INVENTOR(S) : Michael Roelleke

It is certified that error appears in the above-identified patent and that said Letters Patent is hereby corrected as shown below:

Title page,
Item [57], ABSTRACT, change "severties" to -- severities --; and delete "(v), (GS), (v), (S1,S2), (G5), (S1, S2), (GS), (GS), (v), (S1, S2), (v), (Figure 2)"

Column 1,
Line 4, change "BACKGROUND INFORMATION" to -- FIELD OF THE INVENTION --
Line 10, insert -- BACKGROUND INFORMATION --
Lines 11 and 24, change "British Patent Application 2 293 681 A" to -- British Published Patent Application No. 2293681 --
Lines 31-32, insert -- SUMMARY OF THE INVENTION --
Line 32, change "Therefore, the" to -- Therefore, an --
Line 37, delete "with the features of claim 1"
Delete lines 63 and 64.

Column 2,
Line 1, change "means" to -- way --
Line 18, change "in it," to -- in it. --
Line 20, change "curves, and" to -- curves. --
Line 24, change "DESCRIPTION OF A EXAMPLARY EMBODIMENT" to -- DETAILED DESCRIPTION --
Line 36, delete "ADVANTAGES OF THE INVENTION"

Column 3,
Line 42, change "is necessary" to -- is used --

Signed and Sealed this

Twenty-fifth Day of January, 2005

JON W. DUDAS
*Director of the United States Patent and Trademark Office*